May 12, 1925.
O. H. SANDGREN
WINDSHIELD
Filed Dec. 20, 1923
1,537,706
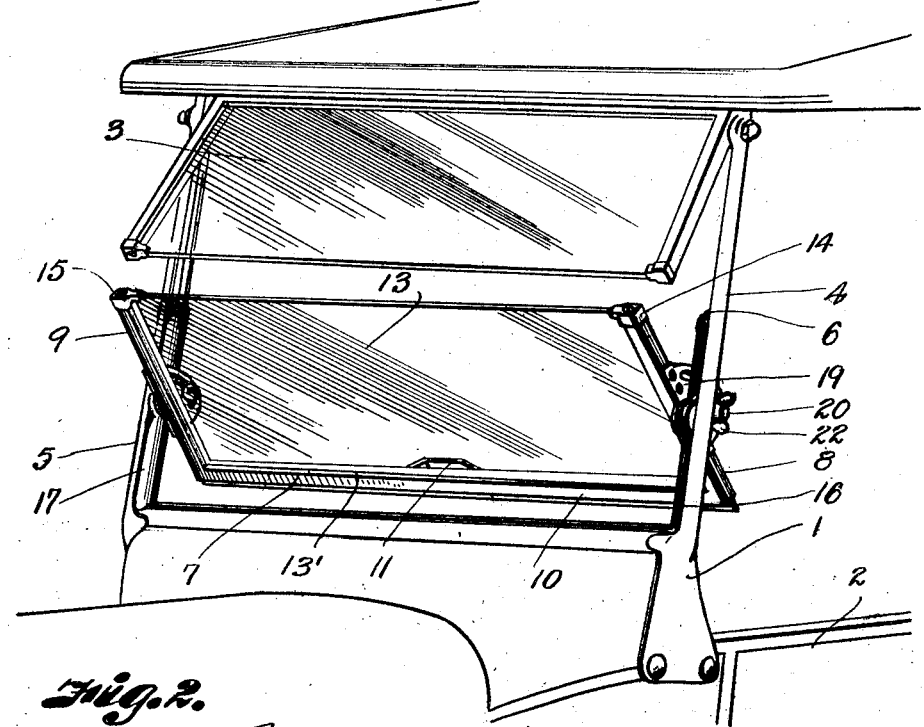
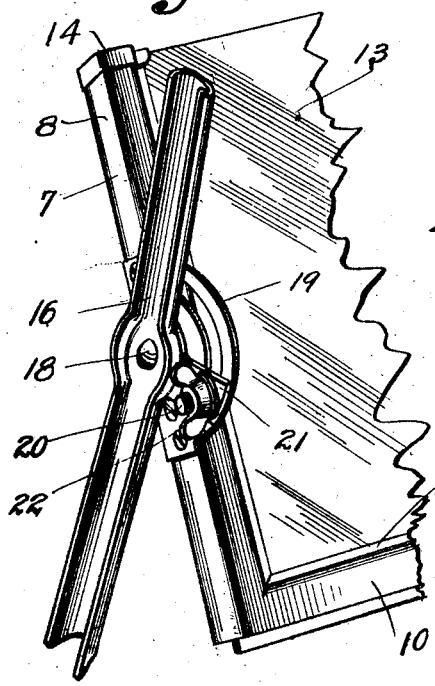
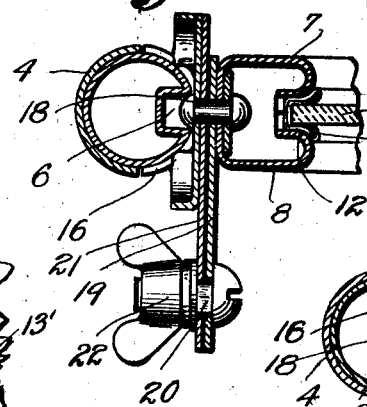
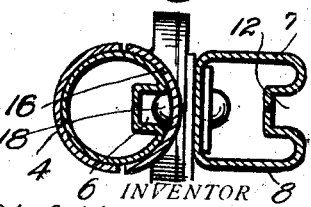
INVENTOR
Olof Helmer Sandgren
BY
ATTORNEY Patented May 12, 1925.

1,537,706

UNITED STATES PATENT OFFICE.

OLOF HELMER SANDGREN, OF KANSAS CITY, MISSOURI.

WINDSHIELD.

Application filed December 20, 1923. Serial No. 681,858.

*To all whom it may concern:*

Be it known that I, OLOF HELMER SANDGREN, a citizen of the United States, residing at Kansas City, in the county of Jackson and State of Missouri, have invented certain new and useful Improvements in Windshields; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to means for pivoting wind shields to motor vehicles, and it is particularly designed as an attachment for the lower wind shield of a "Ford" car such as is disclosed by the 1924 models of cars made by the Ford Motor Company of Detroit, Michigan. The cars now made by the Ford Motor Company have the bottom wind shield rigid in the frame. The frame includes two side standards with grooves and the glass sets in the grooves so that it cannot be turned or swung, the result being that it is impossible to get adequate ventilation into the front of the car.

My invention contemplates an attachment which will fit on the present wind shield frame and carry the glass in a pivoted manner, the attachment being so constructed that it may be applied to the wind shield frame without the necessity of reconstructing any of the parts other than removing the present glass panel constituting the lower wind shield.

The novel construction of the invention will be understood by reference to the following description in connection with the accompanying drawings, in which Fig. 1 is a perspective view of the front of a motor vehicle constructed in accordance with my invention.

Fig. 2 is a perspective view of one end of the attachment.

Fig. 3 is a sectional view through one of the side posts of the wind shield frame.

Fig. 4 is a sectional view through the pivot connection of the attachment and through one of the side posts of the wind shield frame, and Fig. 5 is a cross sectional view through one of the side posts of the wind shield frame and through the attachment, the section being taken above the pivot connection.

The wind shield frame 1 is of usual construction fastened to the body 2 in the usual way and carrying the usual wind shield panel 3. The frame has two side bars 4 and 5 which are tubular in cross section, each side bar having a groove 6 which ordinarily receives the glass window panel. In carrying out my invention, the panel is removed from the grooves 6 and it is placed in a panel frame 7 having side bars 8 and 9 and a lower longitudinal bar 10 to which is preferably secured a handle 11. There is a groove 12 extending along the inner edge of the member 8 along the inner edge of the member 9 and along the inner edge of the member 10 to receive the glass panel 13 in an appropriate manner, the panel being held against rattling by a packing 13'.

The glass panel 13 is held in place by the cap members 14 and 15 which may be secured to the ends of the members 8 and 9. The members 8 and 9 are pivoted to spring clamps 16 and 17. Each clamp consists of a concavo-convex bar pivoted intermediate its ends as at 18 (Fig. 2) to one of the side bars of the panel frame. The clamp on each side of its pivot is sprung by bowing the clamp and inasmuch as the clamp is concave on its outer face, it will fit over the cylindrical post 4 or 5 as the case may be and due to the fact that it is bowed it will firmly grip the post against rattling, thereby forming a snap-on-bracket for the wind shield panel frame consisting of the members 8, 9 and 10.

In order to hold the panel in any adjusted pivoted position, I provide a segmental slotted member 19 on each side member 8 and 9, there being a headed adjusting bolt 20 passing through the slot and through a lug 21 rigid on the snap-on-bracket, the end of the bolt receiving a thumb nut 22 so that the panel can be held in any adjusted position as will be obvious by reference to the drawing.

The method of adjusting the panel is not new as this adjustment has been previously used on other devices, but the construction of the attachment whereby the present rigid glass panel may be removed and an adjustable wind shield be substituted in a convenient manner is what constitutes my invention and I am not aware of any device provided with a snap-on or yielding bracket which may be readily fit over the two side posts of the wind shield frame in the manner disclosed in my description and drawings.

What I claim and desire to secure by Letters-Patent is:

In combination with a wind shield frame, having two side posts, of a glass panel frame, and yielding concavo-convex bracket arms pivoted to the panel frame, the concave portions engaging the posts.

In testimony whereof I affix my signature.

OLOF HELMER SANDGREN.